United States Patent [19]

Starek et al.

[11] Patent Number: 5,991,778
[45] Date of Patent: Nov. 23, 1999

[54] METHOD AND APPARATUS FOR REAL-TIME SECURE FILE DELETION

[75] Inventors: Robert Phillip Starek; George Friedman; David Earl Marshall; Jason Lee Chambers, all of Austin, Tex.

[73] Assignee: Stratfor Systems, Inc., Austin, Tex.

[21] Appl. No.: 08/940,746

[22] Filed: Sep. 30, 1997

[51] Int. Cl.$^6$ .................................................. G06F 17/30
[52] U.S. Cl. ........................ 707/205; 707/206; 707/200
[58] Field of Search .................................. 707/206, 200, 707/202, 205

[56] References Cited

U.S. PATENT DOCUMENTS

| | | | |
|---|---|---|---|
| 4,996,663 | 2/1991 | Nemes | 707/200 |
| 5,265,159 | 11/1993 | Kung | 380/4 |
| 5,689,701 | 11/1997 | Ault et al. | 707/10 |
| 5,761,680 | 6/1998 | Cohen et al. | 707/206 |
| 5,765,192 | 6/1998 | Berliner | 711/136 |
| 5,832,526 | 11/1998 | Schuyler | 707/205 |
| 5,881,229 | 3/1999 | Singh et al. | 709/203 |

FOREIGN PATENT DOCUMENTS

| | | | |
|---|---|---|---|
| 0 575 765 A1 | 6/1993 | European Pat. Off. | G06F 12/02 |
| WO 96/07961 | 3/1996 | WIPO | G06F 1/00 |
| WO 97/26736 | 7/1997 | WIPO | H04L 9/00 |

OTHER PUBLICATIONS

Workplace: The Messy Business of Culling Computer Files, Alex Markels, *The Wall Street Journal*, May 22, 1997.
Examining the Windows 95 Layered File System, by Mark Russinovich and Bryce Cogswell, *Dr. Dobb's Journal*, Dec. 1995.
The Windows 95 File System, 1996 *Knowles Consulting*.
Disk Partioning Under FAT File System Saves Disk Space and Aids in Organization, Sidney D. Peters, *Peters Computer Services*.
Inside the Windows 95 File System, Stan Mitchell, *O'Reilly & Associates, Inc.*, pp. 124–143;202–203.
"Snoop–Proof Your PC", author unknown, (PC Computing vol. 11 No. 3) obtained via internet www.infowar.com, Jan. 3, 1998.

*Primary Examiner*—Anton Fetting
*Assistant Examiner*—Greta L. Robinson
*Attorney, Agent, or Firm*—Baker & Botts, L.L.P.

[57] ABSTRACT

A method and apparatus are provided that enhance file system calls to a file system structure of an operating system. In particular, file system calls can be enhanced to provide real-time secure file deletion on an ongoing basis. A file system call that is intended to perform a function with respect to data stored on a storage device is intercepted. It is then determined whether the file system call is of a type that should be processed. If not, the original file system call is passed on through the file system. If the file system call should be processed, supplemental processing is performed to enhance the original file system call and the file system call is transparently returned to the calling system application. In embodiment, real-time secure file deletion is implemented using a vendor supplied driver (VSD) executing within the installable file system (IFS) of WINDOWS 95.

7 Claims, 3 Drawing Sheets

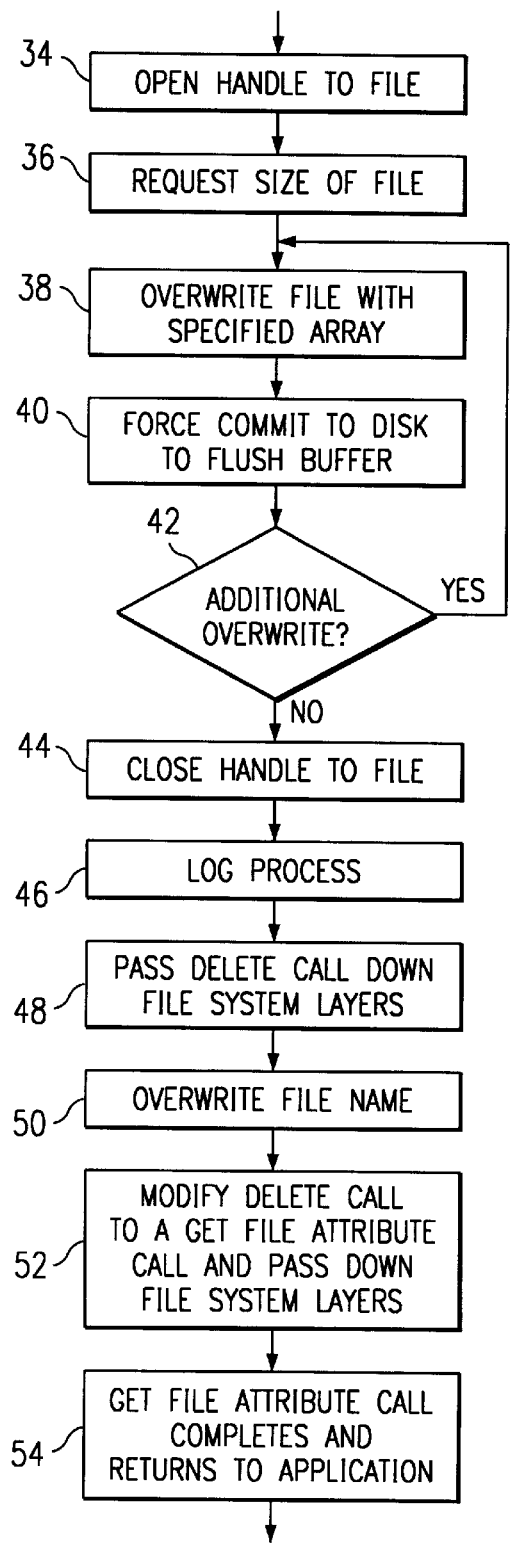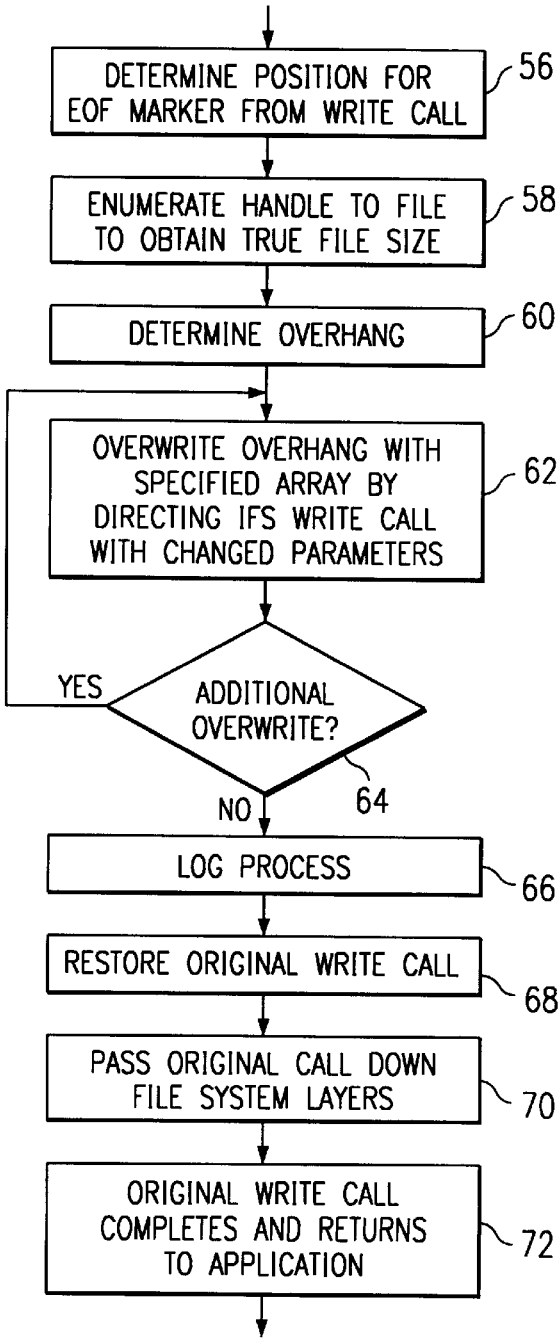

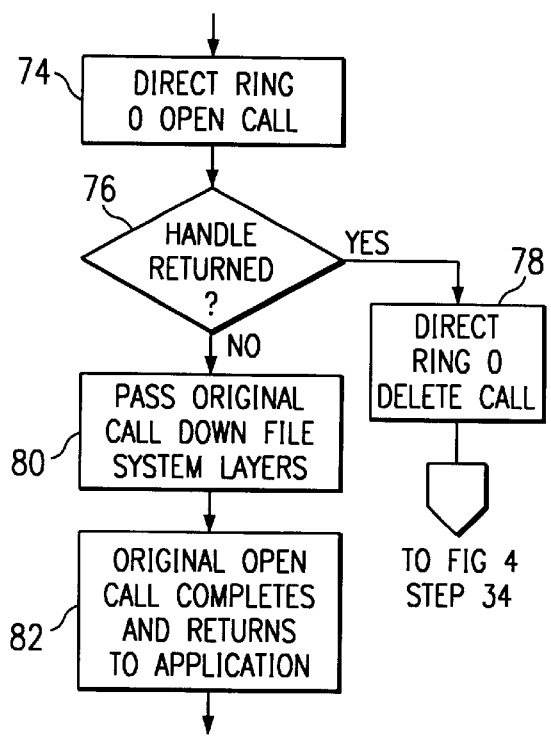
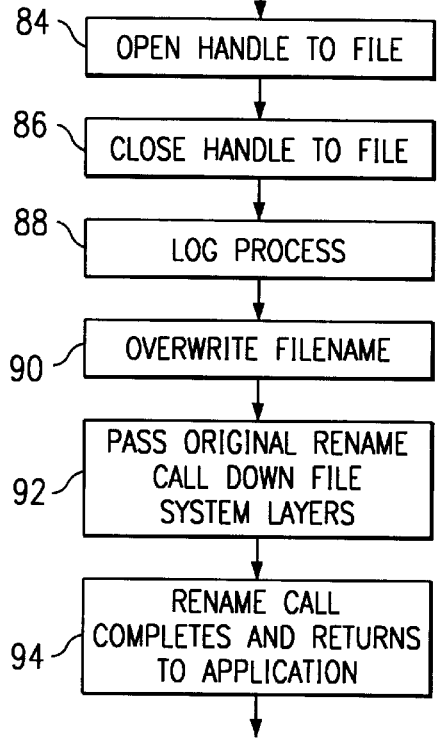
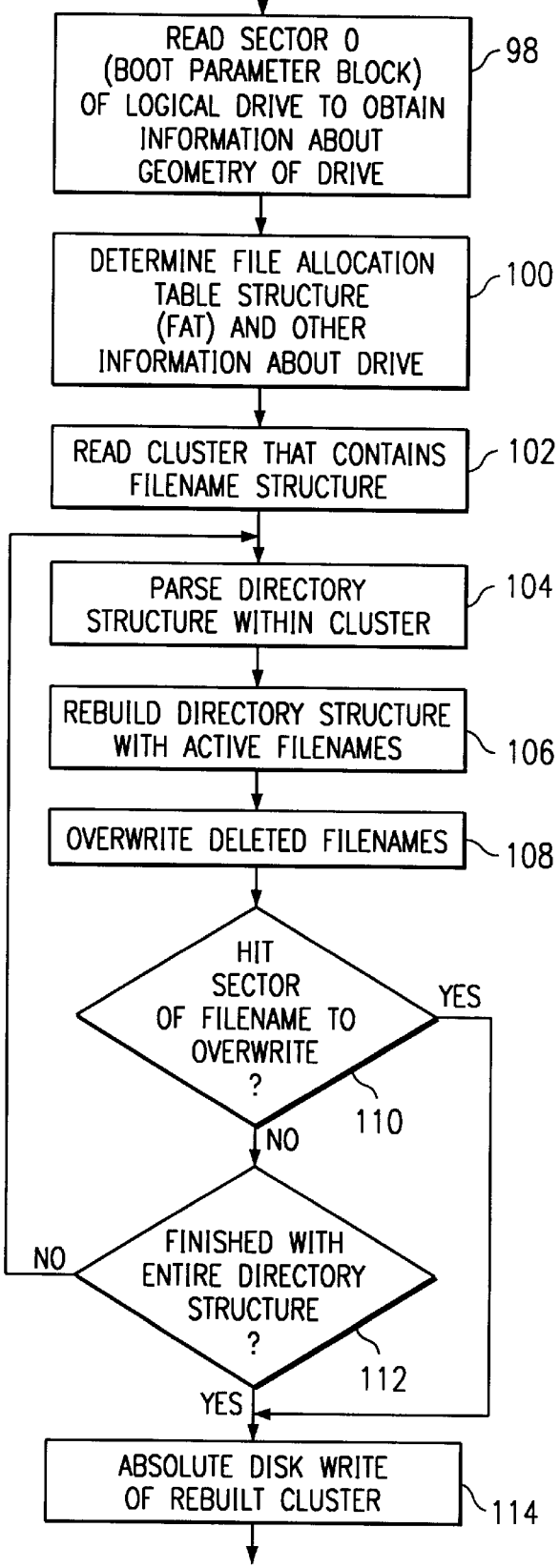

METHOD AND APPARATUS FOR REAL-TIME SECURE FILE DELETION

TECHNICAL FIELD OF THE INVENTION

The present invention relates in general to the field of electronic systems, and more specifically to a method and apparatus for real-time secure file deletion.

BACKGROUND OF THE INVENTION

File management processes executed by operating systems and system applications typically do not implement secure file deletion. For example, in WINDOWS deletion of a file does not make the contents of the file unrecoverable. In fact, it can be a relatively simple process to recover the deleted file. Further, many common software applications such as word processing, e-mail and spreadsheet applications write temporary files during operation. Although these applications typically automatically delete the temporary files, they do so using an insecure file deletion method leaving traces of the files on the hard drive or other storage device. Virtual memory files, such as swap files, also cause a problem in that file fragments are swapped in and out the virtual memory files during operation. The fact that information is thus available on a storage device despite having apparently been deleted generates a security risk that is unacceptable to many individuals and public and private organizations.

One method for alleviating this problem is simply to physically destroy the storage device such that any data stored thereon is unrecoverable. However, this is an understandably expensive and time consuming solution. As an alternative to physical destruction of the storage device, conventional secure file deletion products provide targeted secure file deletion functions. Examples of conventional products include NUKER (available from GENIO USA), MICROZAP (available from NEW TECHNOLOGIES INC.), BURNIT (available from SYNCRONYS SOFTCORP) and SECUREWIN (available from CIPHER LOGICS CORPORATION).

In general, "secure" deletion involves overwriting the appropriate space on the storage device with specified overwrite arrays to obscure the original data. The overwrite arrays can be random or pseudo-random data as well as defined character or data patterns. Further, a series of overwrites can be performed in sequence with different specified arrays to ensure that the data can not be recovered even by destructive analysis of the fixed storage media. Conventional targeted secure deletion products allow a user to select a file for deletion and then securely delete that file. Such products can also allow a user to secure delete all free media space on a storage device. Also, conventional secure delete products may allow a user to secure delete virtual memory files (e.g., swap files).

However, conventional secure file deletion products suffer from a number of problems. One problem is that the targeted nature of the conventional products relies upon user activation of the process. Further, the user only executes the secure deletion process at discrete points in time. Thus, during the period of time between successive executions, the storage device will contain insecurely deleted information. Further, conventional products can be prohibitively time consuming because, to secure a storage device, they have to process the entire device to overwrite all unused storage space.

SUMMARY OF THE INVENTION

In accordance with the present invention, a method and apparatus for real-time secure file deletion are disclosed that provide advantages over previously developed secure file deletion methods and products.

According to one aspect of the present invention, a method and apparatus provide enhancement of file system calls to a file system structure of an operating system. In particular, the file system calls can be enhanced to provide real-time secure file deletion on an ongoing basis. According to the present invention, a file system call that is intended to perform a function with respect to data stored on a storage device is intercepted. It is then determined whether the file system call is of a type that should be processed. If not, the original file system call is passed on through the file system. If the file system call should be processed, supplemental processing is performed to enhance the original file system call and the file system call is transparently returned to the calling system application. In one embodiment, real-time secure file deletion is implemented using a vendor supplied driver (VSD) executing within the installable file system (IFS) of WINDOWS 95.

A technical advantage of the present invention is the interception of file system calls such that supplemental file management processes can be performed in a manner transparent not only to the user but also to the operating system.

Another technical advantage of the present invention is that secure file deletion is performed real-time on an ongoing basis transparently to the user of the system. Thus, secure deletion of files on storage devices is accomplished without relying upon periodic actions by the user.

A further technical advantage of the present invention is that, for write calls, overhang of data in the existing file on the storage device is identified and overwritten as part of the real-time secure deletion process.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 4 is a flow chart of one embodiment of supplemental processing after interception of a delete call according to the present invention;

FIG. 5 is a flow chart of one embodiment of supplemental processing after interception of a write call according to the present invention;

FIG. 6 is a flow chart of one embodiment of supplemental processing after interception of an open(create always) call according to the present invention;

FIG. 7 is a flow chart of one embodiment of supplemental processing after interception of a rename call according to the present invention; and FIG. 8 is a flow chart of one embodiment of overwriting a filename according to the present invention.

DETAILED DESCRIPTION OF THE INVENTION

Figure 1:
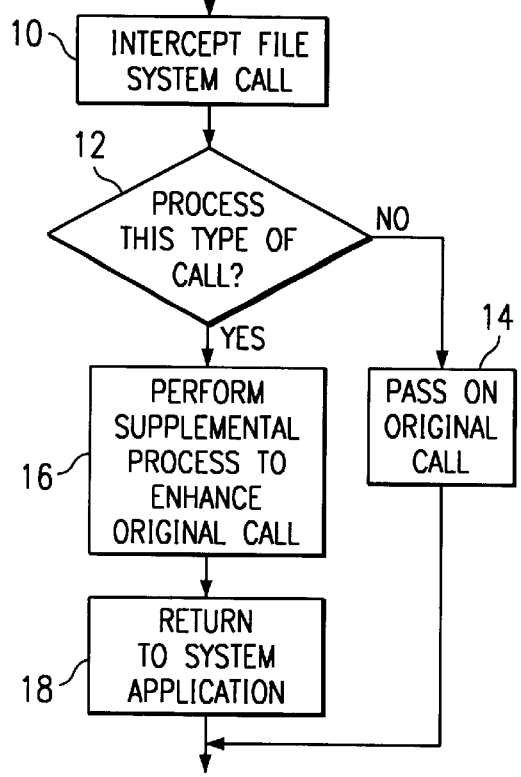
FIG. 1 is a flow chart of one embodiment of a method for enhancing file system calls to a file system structure of an operating system according to the present invention.

FIG. 1 is a flow chart of one embodiment of a method for enhancing file system calls to a file system structure of an operating system according to the present invention. The method of FIG. 1 can be implemented, for example, by a software driver executing within the file system established by the operating system of a personal computer, computer workstation or other computing device. For example, the method of FIG. 1 can be implemented using a vendor supplied driver (VSD) executing within the installable file system (IFS) of WINDOWS 95.

As shown in FIG. 1, in step 10, a file system call is intercepted. In general, the file system call is intended to perform some function with respect to data stored on a storage device but is intercepted before being able to complete that function. The storage device can be a hard disk drive, a ZIP drive, floppy drive, tape drive, writeable CD ROM drive or other fixed or removable storage media. The file system call can be, for example, a file system delete, write, open, rename, close, read or other file system call. In step 12 of FIG. 1, it is determined whether the type of call intercepted is one that should be processed. If not, then in step 14, the original call is passed on through the file system. If the call should be processed, then in step 16, supplemental processing is performed to enhance the original call. In particular, in step 16, the original call can be enhanced to ensure real-time secure file deletion on the storage device. One implementation of supplemental processing to ensure secure file deletion is provided by FIGS. 4–8. According to the present invention, the supplemental processing of step 16 can be accomplished transparently both to the user and to the calling system application. After the supplemental processing, the call is returned, in step 18, to the calling system application.

Figure 2:
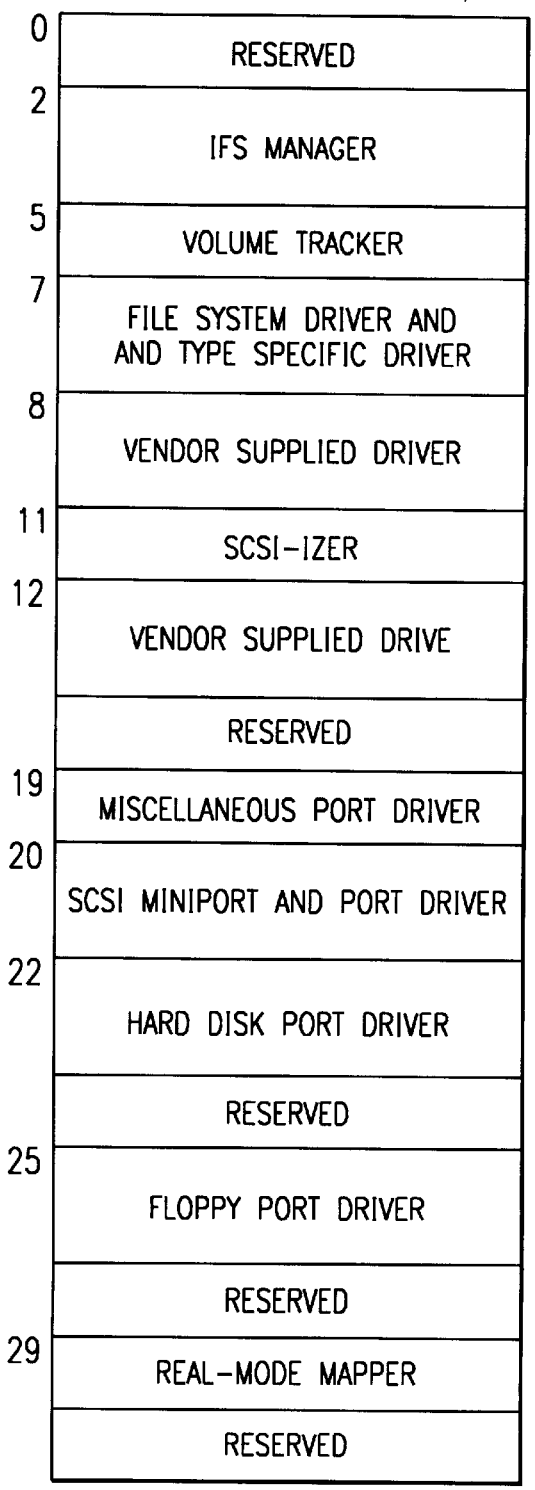
FIG. 2 is a diagram of the file system logical layers of the WINDOWS 95 operating system.

FIG. 2 is a diagram of file system logical layers of the WINDOWS 95 installable file system (IFS). The installable file system is described, for example, in "Examining the Windows 95 Layered File System: Adding Functionality to Block Devices," Mark Russinovich and Bryce Cogswell, 1997 [http://www.ddj.com/ddj/1995/1995.12/russinov.htm as of Sep. 4, 1997]. As shown in FIG. 2, the installable file system is made up of thirty two logical layers, each containing one or more virtual devices through which block-device requests pass. For typical hardware, most of the logical layers are empty. For example, for hard disk drives, a file system request (or call) will usually only pass through about five virtual devices on the way to the hardware.

Figure 3:
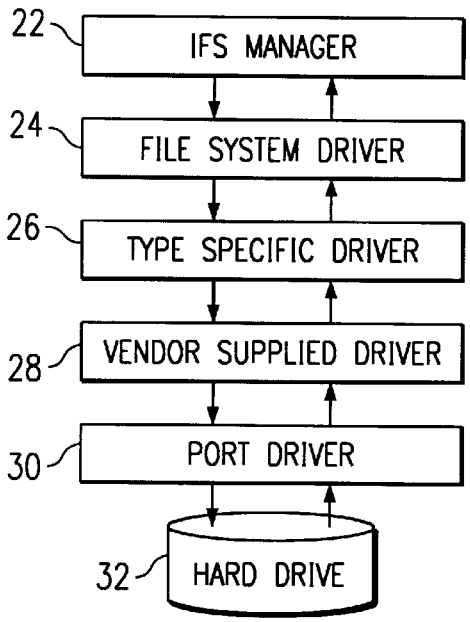
FIG. 3 is a diagram of a typical file system request chain within the file system logical layers of the WINDOWS 95 operating system.

FIG. 3 is a diagram of a typical file system request chain or path within the file system logical layers of the WINDOWS 95 operating system. As shown in FIG. 3, a typical path begins at the IFS manager 22 and moves to the file system driver 24. The request then moves to a type specific driver 26 and a vendor supplied driver 28. After vendor supplied driver 28, the request falls to a port driver 30 and to the hard drive 32 (or other storage device). After the request is completed at the physical level, the request returns up the chain to the calling system application.

In FIG. 2, the numbers on the lefthand side represent the layers of abstraction with the smallest numbers representing higher layers of abstraction. The topmost layer is the entry point to the file system. Higher numbers are closer to the hardware, and the highest number (bottom layer) represents the virtual devices that access the hardware directly. An input/output (I/O) supervisor (IOS) manages requests as they pass through the file-system hierarchy. Each virtual device on the chain can select requests based on the logical or physical drive to which the request is directed. The devices can also view the result of a request as it passes back up the chain to the application. Furthermore, the virtual device drivers (VxDs) on the chain can service requests themselves and not pass them to lower levels, or they can generate requests themselves.

Processes can occur at each level of the installable file system, but most block devices do not require an entry at each level in the chain. At the top of the logical layer structure, the IFS manager layer manages high-level I/O requests from applications. It takes a call directed at a specific logical drive and passes it down the correct call-down chain to the appropriate volume tracker, file system driver (FSD), and so on. Volume trackers work with groups of devices with identical removability rules. For example, a CD-ROM volume tracker ensures that a CD with a file system on it is in the drive before it will allow any requests to pass through to lower layers. File system drivers (FSDs) work with all devices of a particular type, such as hard disks or CD-ROM devices. They take incoming logical requests generated by the IFS manager and translate them into physical requests to pass to lower levels. In addition, FSDs can initiate logical error recovery for devices such as disks.

Type specific drivers (TSDs) work with all devices of a particular type. They take a logical request generated by an FSD and translate it into a physical sector request. They generally reside in the same layer as their corresponding FSDs, but are lower in the chain. SCSI-izers are next in the chain and are used because SCSI devices require more-complex request packets than other devices such as the more-prevalent IDE/ESDI devices. SCSI-izers take a general physical request and create a SCSI Request Block (SRB) that contains detailed, SCSI-specific information about the request such as the Logical Unit Number (LUN) and Target (SCSI targets can have up to seven LUNs hanging off them).

Vendor supplied drivers (VSDs) provide a special layer for third-party developers under WINDOWS 95. Consequently, the VSD layer functionality is determined by the VSD writer. Conventional uses include: block-device monitors, low-level secondary disk caches (caching in flash memory, for example), data encryption, and RAID disk management.

SCSI port drivers take incoming requests and determine which SCSI miniport driver should field them. Multiple SCSI types can be loaded onto the same system, each of which may require a custom SCSI miniport driver. The SCSI port driver is also in charge of initializing the miniport drivers. SCSI miniport drivers (MPDs) are the hardware drivers for SCSI devices. They manage the interrupt and I/O port-level interaction with the device to carry out requests from above. They can also perform adapter-specific error recovery.

Port drivers (PDRs) (for non-SCSI hardware) carry out analogous functions as the SCSI port and miniport drivers. They provide 32-bit disk access interacting directly with the hardware to perform I/O. The real mode mapper (RMM) is used in certain situations where WINDOWS 95 can not provide a port drive. With the introduction of plug-and-play BIOS, and by including many hardware-specific port drivers, WINDOWS 95 can usually provide 32-bit access for most disk hardware. However, Windows 95 might be run on an older personal computer with esoteric hardware, so it must make allowances for the case where it can not provide a port driver to handle disk I/O in protected mode. A system might also use real-mode disk-driver software that provides functionality not available in the WINDOWS 95 protected-mode counterpart. For these situations, the last entry on the chain of protected-mode virtual device drivers is an RMM instead of a port driver. RMMs call down to a real-mode driver to perform hardware I/O and return results up the file-system chain. Real-mode drivers are hardware drivers required by the hardware or software configuration of a particular system. However, use of real-mode drivers is discouraged because performance can suffer (due to the overhead of transitions from protected to real mode and slower execution in real mode), but makes allowances for them for flexibility and backward compatibility.

In general, the upper layers of the file system structure are written by MICROSOFT as part of WINDOWS 95, while the lower layers are provided by disk-drive manufacturers. Consequently, the layer typically used for development by third-party developers is the virtual device driver (VSD) layer. As mentioned above, according to the present invention, a VSD can be used to intercept file system calls and perform supplemental processing. In particular, the files system calls can be enhanced to ensure real-time secure file deletion.

In one implementation of the present invention, a vendor supplied driver is used to intercept file system delete, write, open(create always) and rename calls and to provide the real-time secure file deletion functionality. Interception of the these calls occurs in step 10 of FIG. 1. The above calls are then identified, in step 12, as ones for which supplemental processing will be performed. Supplemental processing then occurs within step 16 of FIG. 1.

FIG. 4 is a flow chart of one embodiment of supplemental processing after interception of a delete call according to the present invention. In step 34, the driver opens a handle to the file identified in the delete call, and in step 36, the driver requests the size of the file. Then in step 38, the driver overwrites the file with a specified overwrite array. The specified array can be any desired pattern of characters or data and can be user defined or default to a pre-defined pattern. In step 40, the driver generates a force commit to disk to flush the write buffer of the storage device and ensure that the overwrite array is actually written to the media. In step 42, the driver checks whether additional overwrites should be performed. If so, the driver returns to step 38. Each overwrite iteration can use a different overwrite array to attain increasing levels of security. For example, the overwrite arrays can cause each storage location to alternatively be written to a "0" and a "1" to obscure the original data stored at that location. In some implementations, there are seven overwrite iterations to ensure that the original data is securely deleted even if analyzed using destructive testing and advanced detection equipment.

After the overwrite process is complete, the driver closes the handle to the file in step 44. In step 46, the driver logs the process just completed to an in-memory log. The in-memory log can be periodically written to the storage device as a log file. In step 48, the driver passes the original delete call down the file system layers such that the proper flags are set for the system to consider the delete to have properly completed. In step 50, the driver then overwrites the filename of the file just deleted. One embodiment of overwriting the filename is shown in and described with respect to FIG. 8. After overwriting the filename, in step 52, the driver modifies the original delete call to make it a get file attribute call and passes the new call down the file system layers. In step 54, the get file attribute call completes and returns to the calling system application.

FIG. 5 is a flow chart of one embodiment of supplemental processing after interception of a write call according to the present invention. For the write call, the call is intercepted and captured by the driver only if the write has a length of zero. This indicates that the write call is placing the end-of-file (EOF) marker after the contents of the file have already been written to the storage device. After interception of a write call with length zero, in step 56, the driver determines the position for the end-of-file (EOF) marker directly from the write call. In step 58, the driver obtains the true file size of the file using an enumerate handle function. Then, in step 60, the driver determines the overhang, if any, of the file based upon the true file size and the position of the new EOF marker. The overhang is the portion of the file that existed prior to the write that would extend past the new EOF marker.

In step 62, the driver overwrites the overhang with a specified overwrite array. As was described above, the overwrite array can be user-defined or pre-defined and is designed to obscure the original data stored in the storage device. In step 62, the driver performs the overwrite by directing the original intercepted write call to the file system with changed parameters such that the overhang is overwritten. Then, in step 64, the driver determines whether additional overwrites should be performed. If so, the application returns to step 62. Successive iterations of overwrites can use different overwrite arrays to better ensure secure deletion as described above. After overwriting the overhang, the driver logs the process in the in-memory log which can be periodically written to the storage device. Then, in step 70, the driver passes the original write call down the file system layers to place the EOF marker as originally intended. In step 72, this write call completes and returns to the calling system application.

FIG. 6 is a flow chart of one embodiment of supplemental processing after interception of an open(create always) call according to the present invention. An open(create always) call is one that opens a file and, in doing so, always creates a new file rather than simply opening the existing file. This means that the old file still exists on the storage device and may not be overwritten by the newly created file. After interception c,f the open(create always) call, the driver directs a "ring zero" open call through the file system. A "ring zero" call is one that process down from the IFS manager through the entire file system logical layer structure. Thus, the ring zero open call will be passed back to the driver.

In step 76, the driver determines whether a handle for the file is returned. If a handle is returned, it indicates that the file exists, otherwise the file is a new file. If a handle is returned, then the handle is closed and, in step 78, the driver directs a ring zero delete call for the existing file. This delete call is passed back to the driver and intercepted as with other delete calls such that processing continues at step 34 of FIG. 4. If it is determined in step 76 that a handle was not returned, then the driver passes the original open(create always) call down the file system layers in step 80. In step 82, the original open call completes and returns to the system application.

FIG. 7 is a flow chart of one embodiment of supplemental processing after interception of a rename call according to the present invention. In step 84, the driver opens a handle to the file. Opening a handle to the file provides information about the file which is returned in the file open block structure. This information is needed to perform the overwrite filename process of FIG. 8 and is described below. In step 86, the driver closes the handle to the file, and then, in step 88, logs the process to the in-memory log. The driver passes the original rename call down the file system layers in step 90. Then, in step 92, the driver overwrites the old filename, for example, according to the process of FIG. 8. In step 94, the driver modifies the original rename call to a get attribute call and passes the get attribute call down the file system layers. In step 96, the get attribute call completes and returns to the calling system application.

FIG. 8 is a flow chart of one embodiment of overwriting a filename according to the present invention. The process of FIG. 8 ensures that deleted filenames are overwritten and organizes active filenames within the directory structure. Prior to starting the process of FIG. 8, the driver has information about the file based upon having opened a handle to the file. In particular, the file open block structure provides the starting sector for the directory entry of the filename and the starting cluster of the directory structure. The following table sets forth the position of this information within the file open block structure for WINDOWS 95 GOLD and OSR2 versions.

| OFFSET & LABEL GOLD 95 | | OFFSET & LABEL OSR2 | | COMMENT |
|---|---|---|---|---|
| 40 | DWORD d40 | 18 | DWORD d18 | starting sector for directory entry of filename |
| 50 | DWORD sector_pos | 1C | DWORD d20 | starting cluster of directory structure |

This starting sector and starting cluster information is used by the driver to locate and overwrite filenames.

In step 98 of FIG. 8, the driver reads sector zero (the boot parameter block) of the logical drive to obtain information about the geometry of the logical drive. Then, in step 100, the driver determines the file allocation table (FAT) structure and other information about the logical drive. In step 102, the driver reads the cluster that contains the directory structure containing the filename to be overwritten. The correct cluster can be determined using the starting cluster of directory structure obtained from the file open block structure as shown in the above table.

After the cluster has been read, in step 104, the driver parses the directory structure within the cluster to process each field within the directory structure. The directory structure contains sequentially positioned fields for filenames that each consume, for example, 32 bytes of storage. In step 106, if the driver encounters an active filename, the driver rebuilds the directory structure by adding the active filename. In step 108, if the driver encounters a deleted filename, the driver overwrites the deleted filename with a specified overwrite array. As described above, the overwrite array can be a user-defined or pre-defined pattern designed to obscure the original data. Further, the overwriting of step 108 can involve one or multiple overwrites to provide varying levels of secure deletion.

In step 110, the driver checks whether it has reached the specific sector or filename that initiated the overwrite. If so, the filename overwrite process continues at step 114. If not, in step 112, the driver checks whether it has finished the entire directory structure. If so, the process continues at step 114. If not, the driver determines the next cluster for the directory structure in step 116, and the driver reads in the structure in step 118. Then, the process returns to step 104 to continue parsing the directory structure. After the filename has been overwritten, in step 114, the driver forces an absolute disk write of the rebuilt cluster containing the active filenames to ensure that the data is actually written to the storage device.

According to the above implementation of the present invention, the file system delete, write, open(create always) and rename calls are intercepted and processed to provide secure file deletion. This secure file deletion is performed real-time on an ongoing basis transparently to the user of the system. Thus, secure file deletion is accomplished without relying upon periodic actions by the user.

Although the present invention has been described in detail, it should be understood that various changes, substitutions and alterations can be made hereto without departing from the spirit and scope of the invention as defined by the appended claims.

What is claimed is:

1. A method for enhancing file system delete calls of an operating system, comprising:

intercepting a file system call, the file system call intended to perform a function with respect to data stored on a storage device;

determining whether the file system call is a delete call; and if the file system call is a delete call, performing supplemental processing comprising:

opening a handle to a file identified in the delete call;
requesting a size of the file;
overwriting the file with a specified overwrite array;
generating a force commit to disk to flush a write buffer of the storage device and ensure that the overwrite array is actually written to the storage device;
closing the handle to the file;
passing the delete call down the file system such that proper flags are set for the delete call to have properly completed;
overwriting a filename of the file; and
modifying the delete call into a get file attribute call and passing the get file attribute call down the file system layers.

2. The method of claim 1, further comprising:

prior to the step of closing, checking whether additional overwrites should be performed; and if so, repeating the steps of overwriting and generating, each overwrite iteration using a different overwrite array to attain increasing levels of security.

3. The method of claim 1, wherein the step of overwriting the filename of the file comprises:

reading sector zero, which is the boot parameter block, of a logical drive containing the file to obtain information about a geometry of the logical drive;

determining a file allocation table (FAT) structure of the logical drive;

reading a cluster that contains the directory structure containing the filename to be overwritten;

parsing the directory structure within the cluster to process each field within the directory structure, wherein:

if an active filename is encountered, rebuilding the directory structure with the active filename; and if a deleted filename is encountered, overwriting the deleted filename with a specified overwrite array;

checking whether the sector or filename that initiated the overwrite has been reached, and if so, advancing to the step of forcing;

checking whether the entire directory structure has been parsed, and if not, returning to the step of parsing;

forcing an absolute disk write of the rebuilt cluster containing the active filenames.

4. The method of claim 3, further comprising repeating the step of overwriting the deleted filename for a specified number of iterations, each overwrite iteration using a different overwrite array to attain increasing levels of security.

5. A method for enhancing file system write calls, comprising:

identifying a write call with a length of zero which indicates that the write call is placing a new end-of-file (EOF) marker;

determining a position for the new end-of-file (EOF) marker directly from the write call;

obtaining a true file size of the file using an enumerate handle function;

determining overhang, if any, of the file based upon the true file size and the position of the new end-of-file (EOF) marker, where the overhang is a portion of the file that existed prior to the write call and that extends past the new end-of-file (EOF) marker;

overwriting the overhang with a specified overwrite array by directing the intercepted write call to the file system with changed parameters such that the overhang is overwritten and committed to disk; and passing the intercepted write call down the file system to place the new end-of-file (EOF) marker as originally intended.

6. The method of claim 5, further comprising:

prior to the step of passing, determining whether additional overwrites should be performed; and if so, repeating the step of overwriting, each overwrite iteration using a different overwrite array to attain increasing levels of security.

7. A method for enhancing file system open (create always) calls, comprising:

intercepting an open (create always) call;

directing a "ring zero" open call through the file system;

when the ring zero open call is passed back, determining whether a handle for the file is returned;

if a handle is returned indicating an existing file, directing a ring zero delete call for the existing file which is then processed as with other intercepted delete calls; and if a handle is not returned, passing the intercepted open (create always) call down the file system.

* * * * *